United States Patent
Yan et al.

(10) Patent No.: US 11,638,098 B2
(45) Date of Patent: Apr. 25, 2023

(54) SCREEN SOUNDING SYSTEM

(71) Applicant: AAC Technologies Pte. Ltd., Singapore (SG)

(72) Inventors: Xudong Yan, Shenzhen (CN); Hao Gu, Shenzhen (CN); Wei Liu, Shenzhen (CN); Pengfei Zhang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 319 days.

(21) Appl. No.: 16/993,286

(22) Filed: Aug. 14, 2020

(65) Prior Publication Data

US 2021/0067878 A1    Mar. 4, 2021

(30) Foreign Application Priority Data

Aug. 26, 2019    (CN) .......................... 201921404424.9

(51) Int. Cl.
*H04R 9/06* (2006.01)
*H04R 9/02* (2006.01)
*H04M 1/02* (2006.01)
*H04R 1/02* (2006.01)

(52) U.S. Cl.
CPC ............ *H04R 9/06* (2013.01); *H04M 1/0266* (2013.01); *H04R 9/025* (2013.01); *H04R 1/028* (2013.01); *H04R 2400/11* (2013.01)

(58) Field of Classification Search
CPC .......... H04R 9/06; H04R 9/025; H04R 1/028; H04R 2400/11; H04R 9/066; H04R 2499/15; H04R 1/025; H04M 1/0266; H04M 1/03

See application file for complete search history.

(56) References Cited

U.S. PATENT DOCUMENTS

| | | | |
|---|---|---|---|
| 11,044,550 B2* | 6/2021 | Hsu ....................... | H04R 1/288 |
| 2014/0185859 A1* | 7/2014 | Wilk ..................... | H04R 9/025 |
| | | | 381/412 |
| 2018/0025669 A1* | 1/2018 | Hiatt ..................... | G09B 29/02 |
| | | | 434/430 |
| 2019/0230423 A1* | 7/2019 | Guo ....................... | H01L 41/09 |
| 2021/0006880 A1* | 1/2021 | Yan ....................... | H04R 1/028 |
| 2022/0014852 A1* | 1/2022 | Yang ................ | G02F 1/133528 |

FOREIGN PATENT DOCUMENTS

| | | | | |
|---|---|---|---|---|
| CN | 101316457 A | * | 12/2008 | |
| WO | WO-2010121674 A2 | * | 10/2010 | ....... B32B 17/10018 |

* cited by examiner

*Primary Examiner* — Angelica M McKinney
(74) *Attorney, Agent, or Firm* — W&G Law Group

(57) ABSTRACT

The present application discloses a screen sounding system having a screen, an exciter for driving the screen, and a magnetic element fixedly connected with the screen. The exciter includes a housing with an accommodation space and a magnet arranged in the accommodation space. The housing is fixed on the magnetic element through magnetic attraction force between the magnet and the magnetic element. Compared with the related art, the screen sounding system disclosed by the present application facilitates removal and installation of the exciter. The position of the exciter can be adjusted through slip. Meanwhile, the magnetic element can avoid an influence on the screen caused by a magnetic field of the exciter.

9 Claims, 2 Drawing Sheets

SCREEN SOUNDING SYSTEM

FIELD OF THE PRESENT DISCLOSURE

The present application relates to technical field of sound generation technologies, in particular to a screen sounding system.

DESCRIPTION OF RELATED ART

A screen sounding technology refers to a technology of placing an exciter behind a display screen, transferring vibration of the exciter to the display screen through coupling of the exciter and the display screen and making a sound through vibration of the display screen.

The screen sounding system in the related art comprises a screen and the exciter fixedly connected with the screen and used for driving the screen to make the sound. However, in the screen sounding system in the related art, the exciter and the screen are usually bonded by a double-sided adhesive tape or a solvent adhesive. Thus, due to the fixed connection of the exciter and the screen, it is difficult to remove and replace components of the exciter, meanwhile, a positional deviation cannot be easily corrected when occurring during installation of the exciter, and scrapping of the screen is easily caused.

Therefore, aiming at the disadvantages that the exciter in the screen sounding system in the related art is difficult to remove and replace and the position cannot be easily adjusted, it is necessary to provide a novel screen sounding system which facilitates removal and installation of the exciter, and can adjust the position of the exciter for avoiding the influence on the screen caused by a magnetic field of the exciter through a magnetic element to solve the problems.

SUMMARY OF THE INVENTION

One of the main objects of the present invention is to provide a screen sounding system which can avoid an influence on the screen caused by a magnetic field of the exciter.

Therefore, the present invention provides a screen sounding system, comprising: a screen capable of vibrating; an exciter for driving the screen to make a sound through vibration; and a magnetic element fixedly connected with the screen. The exciter is arranged at one side of the magnetic element far away from the screen, and comprises a housing with an accommodation space with a magnet arranged therein. The housing is coupled to the magnetic element through magnetic attraction force between the magnet and the magnetic element.

Further, an orthographic projection of the exciter toward the magnetic element completely falls on the magnetic element.

Further, the magnetic element is a magnetic-conducting steel sheet.

Further, the magnetic element is a permanent magnet.

Further, the screen sounding system further comprises a middle frame for fixing the screen, wherein the housing comprises a main body part and a connection part extending out along the direction perpendicular to vibration from the main body part; and the connection part is fixedly connected with the middle frame.

Further, the screen sounding system further comprises a substrate fixed on the screen, wherein the magnetic element is fixed at one side of the substrate far away from the screen.

Further, a projection of the main body part along the vibration direction completely overlaps with the projection of the magnetic element along the vibration direction.

Further, the material of the magnetic element is a soft magnet.

Further, the magnetic element is glued to the screen.

BRIEF DESCRIPTION OF THE DRAWINGS

In order to more clearly describe the technical scheme in the embodiment of the present invention, a brief introduction will be given below to the accompanying drawings which need to be used in the embodiment descriptions, obviously, the accompanying drawings in the following description are only some embodiments of the present invention, and for those who are commonly skilled in the art, other figures may be obtained from these figures without creative effort, in which.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment I

Figure 1:
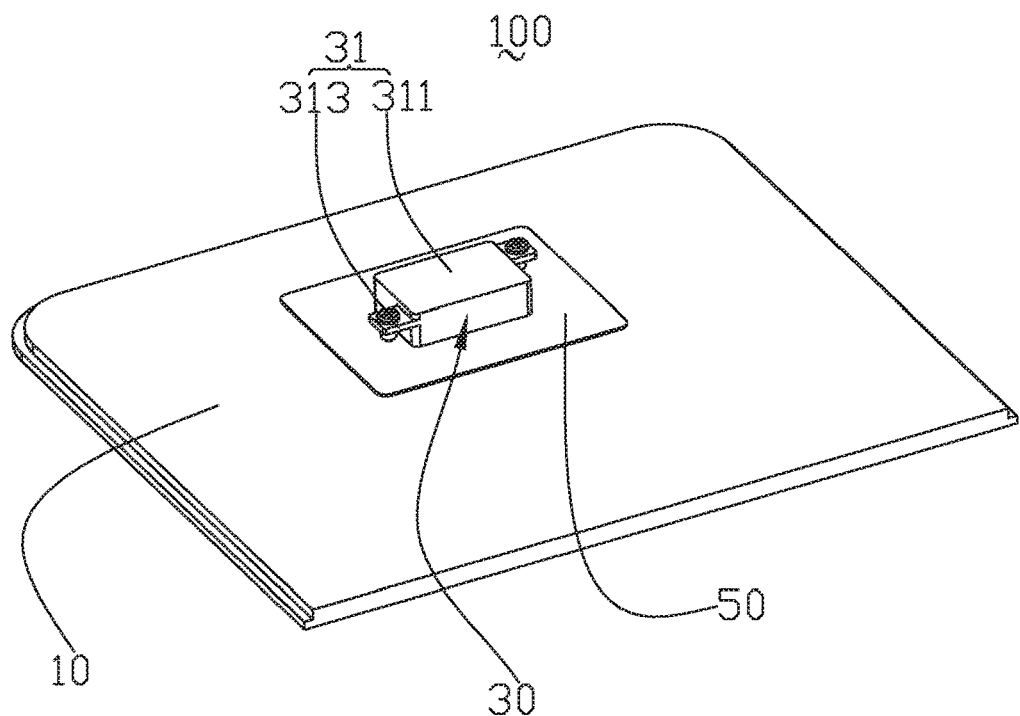
FIG. 1 is an isometric view of a screen sounding system provided by an embodiment I of the present application.

Referring to FIG. 1, the present application provides a screen sounding system 100. The screen sounding system 100 comprises a screen 10 capable of vibrating, an exciter 30 of driving the screen 10 to make a sound through vibration, a magnetic element 50 fixedly connected with the screen 10, and a middle frame used for fixing the screen 10.

Preferably, the magnetic element 50 is glued to the screen 10.

The exciter 30 is arranged at one side, far away from the screen 10, of the magnetic element 50. That is to say, the exciter 30 is connected with the screen 10 through the magnetic element 50; and meanwhile, the exciter 30 is coupled to the screen 10, vibration of the exciter 30 is transferred to the screen 10 and a sound is made through vibration of the screen 10.

Specifically, the exciter 30 comprises a housing 31 with an accommodation space and a magnet arranged in the accommodation space. The housing 31 is fixed on the magnetic element 50 through magnetic attraction force between the magnet and the magnetic element 50. Compared with a mode of directly gluing the exciter to the screen in the related art, this magnetic attraction mode facilitates removal, installation and replacement of the exciter 30; and meanwhile, the position of the exciter 30 can be directly adjusted through slip when a positional deviation of the exciter 30 occurs.

The housing 31 comprises a main body part 311 and a connection part 313 extending out along the direction perpendicular to vibration from the main body part 311. The main body part 311 is provided with an accommodation space. The magnet of the exciter 30 is accommodated into the accommodation space.

The connection part 313 is fixedly connected with the middle frame to further reinforce the stability and reliability of the exciter 30. The connection part 313 is connected with the middle frame in a threaded fastening manner.

The magnetic element 50 is a magnetic-conducting steel sheet or a permanent magnet, and an orthographic projection of the exciter 30 toward the magnetic element 50 completely falls on the magnetic element 50. The material of the magnetic-conducting steel sheet is a soft magnet.

Embodiment II

Figure 2:
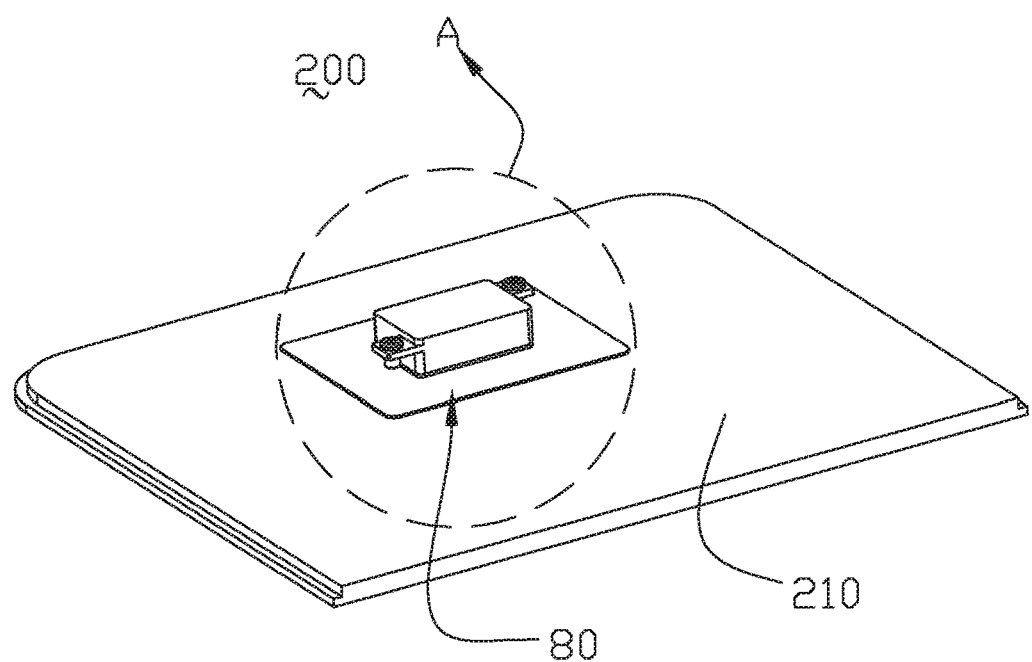
FIG. 2 is an isometric view of a screen sounding system provided by another embodiment of the present application.
Figure 3:
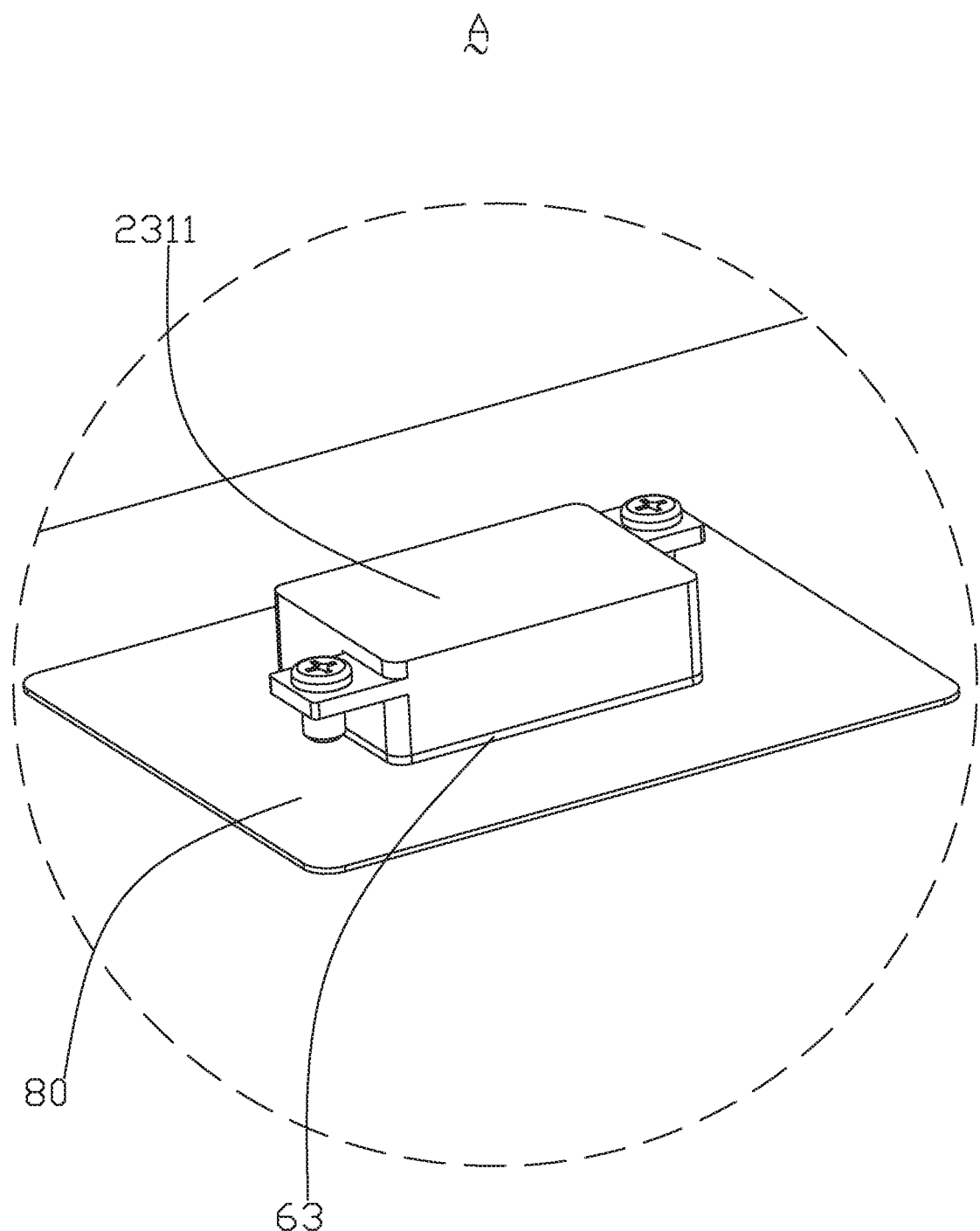
FIG. 3 is an enlarged view of part A in FIG. 2.

Referring to FIGS. 2 and 3, a screen sounding system 200 provided by the embodiment is basically the same as the screen sounding system 100 provided by the embodiment I in structure, and the difference is that the screen sounding system 200 further comprises a substrate 80 fixed on the screen 210.

In this embodiment, the magnetic element 63 is fixed at one side, far away from the screen 210, of the substrate 80, and a projection of the main body part 2311 along the vibration direction completely overlaps with that the projection of the magnetic element 63 along the vibration direction.

The material of the magnetic element 63 is the soft magnet. Thus, the material of the substrate 80 is not limited to a magnetic conduction material, so as to reduce the material cost.

Compared with the related art, in the screen sounding system of the present application, the magnetic element fixedly connected with the screen is arranged, and the magnet and the magnetic element magnetically attract each other, so that the housing is fixedly connected with the magnetic element. This magnetic attraction mode can avoid the connection of the exciter and the screen in a threaded fastening manner, or a permanent bonding manner and other manners, and facilitates removal, installation and replacement of the exciter. The fixation mode of magnetic attraction facilitates position adjustment of the exciter by a user; and meanwhile, the magnetic element can avoid an influence on the screen caused by a magnetic field of the exciter.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A screen sounding system, comprising:
a screen capable of vibrating;
an exciter for driving the screen to make a sound through vibration;
and a magnetic element fixedly connected with the screen; wherein
the exciter is arranged at one side of the magnetic element far away from the screen and is directly fixed to the magnetic element, and comprises a housing with an accommodation space with a magnet arranged therein; and
the housing is coupled and directly fixed to the magnetic element through magnetic attraction force between the magnet and the magnetic element.

2. The screen sounding system as described in claim 1, wherein an orthographic projection of the exciter toward the magnetic element completely falls on the magnetic element.

3. The screen sounding system as described in claim 1, wherein the magnetic element is a magnetic-conducting steel sheet.

4. The screen sounding system as described in claim 3, further comprising a middle frame for fixing the screen, wherein the housing comprises a main body part and a connection part extending out along a direction perpendicular to vibration from the main body part; and the connection part is fixedly connected with the middle frame.

5. The screen sounding system as described in claim 4, further comprising a substrate fixed on the screen, wherein the magnetic element is fixed at one side of the substrate far away from the screen.

6. The screen sounding system as described in claim 5, wherein a projection of the main body part along a vibration direction completely overlaps with a projection of the magnetic element along the vibration direction.

7. The screen sounding system as described in claim 6, wherein of the magnetic element is a soft magnet.

8. The screen sounding system as described in claim 6, wherein the magnetic element is glued to the screen.

9. The screen sounding system as described in claim 1, wherein the magnetic element is a permanent magnet.

\* \* \* \* \*